United States Patent [19]

Mao

[11] Patent Number: 4,974,871
[45] Date of Patent: Dec. 4, 1990

[54] FOLDABLE HAND TRUCK
[75] Inventor: James C. C. Mao, Taipei, Taiwan
[73] Assignee: Jiun Long Metal Industrial Co., Ltd., Taipei, Taiwan
[21] Appl. No.: 461,696
[22] Filed: Jan. 8, 1990
[51] Int. Cl.⁵ .............................................. B62B 3/02
[52] U.S. Cl. .............................. 280/651; 280/47.371; 280/655
[58] Field of Search ................. 280/38, 641, 645, 651, 280/652, 654, 655, 655.1, 47.315, 47.371, 37

[56] References Cited

U.S. PATENT DOCUMENTS

| | | | |
|---|---|---|---|
| 3,037,308 | 6/1962 | Miller | 280/47.315 |
| 4,591,183 | 5/1986 | Gordon et al. | 280/655 |
| 4,705,282 | 11/1987 | Berfield | 280/47.371 |

FOREIGN PATENT DOCUMENTS

| | | | |
|---|---|---|---|
| 1509040 | 1/1968 | France | 280/655 |
| 2099766 | 12/1982 | United Kingdom | 280/655 |

Primary Examiner—Charles A. Marmor
Assistant Examiner—Eric Culbreth
Attorney, Agent, or Firm—Poms, Smith, Lande & Rose

[57] ABSTRACT

A foldable hand truck comprises a retractible and extendable push handle set having a first set of round holes and a second set of round holes separately formed at a lower and a higher positions; a platform movably provided below the push handle set; a wheel set being mounted on the lower end of the push handle set and beneath the platform; and a platform retraction mechanism including a housing with its top end movably associated with the push handle set and with its lower end removably fixed to the underside of the platform; a push button for controlling the platform retraction mechanism; and a pair of movable push rods; wherein two outer ends of the pair of movable push rods may insert into either the first set of round holes or the second set of round holes on the push handle set; and two inner ends of the pair of movable push rods may shift within two slant slots formed on the push button so as to pull the two outer ends out of the first or the second set of round holes while the push button being pressed down.

6 Claims, 6 Drawing Sheets

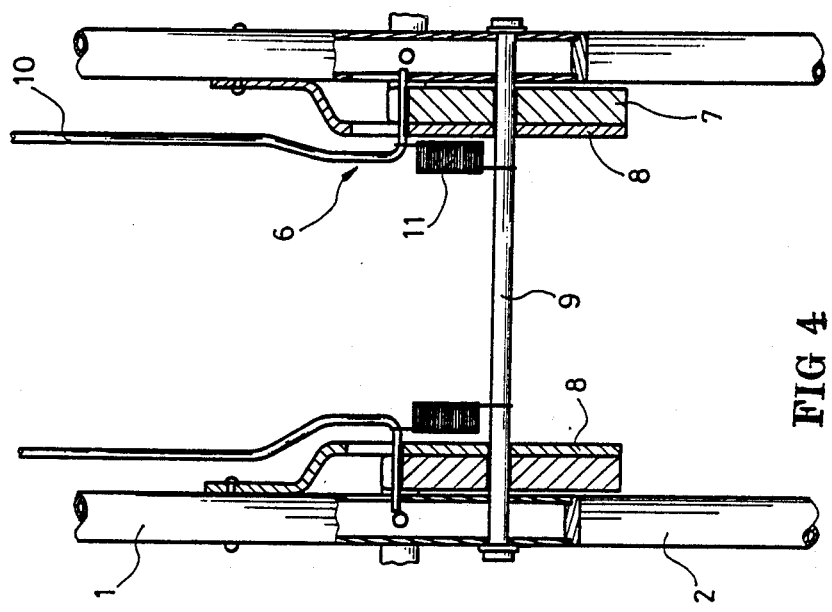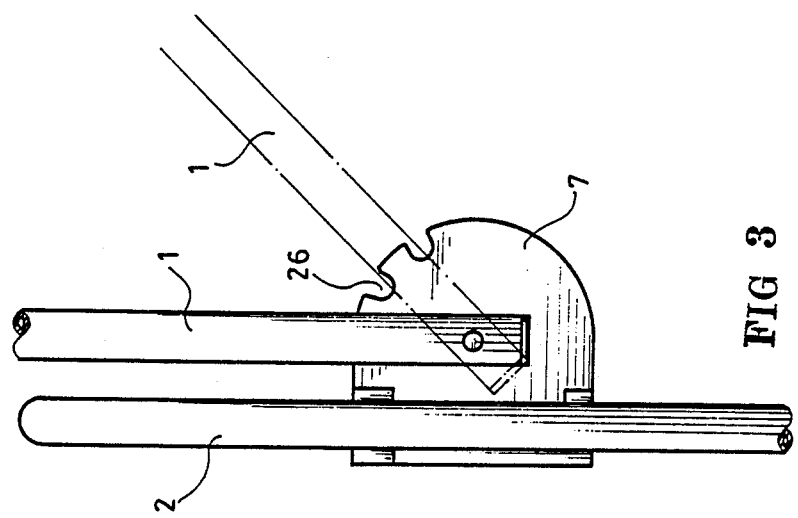

4,974,871

FOLDABLE HAND TRUCK

BACKGROUND OF THE INVENTION

The present invention relates generally to a hand truck, and more particularly to a foldable hand truck of which the length and angle of its push handle can be adjustably controlled while it can be stably positioned either in a working status or in a folded status. Most hand trucks are already known to have two wheels and a reticulate container or retainer for holding or carrying articles. When handling such hand trucks, it is usually necessary to backward incline the container or retainer and the handle to form a suitable angle to the ground in order to permit the hand truck to move forward smoothly. In the event an article is not allowed to be inclined during its movement, it cannot be transported by such hand truck. Besides, such hand trucks cannot be vertically and stably positioned when they are folded, if they can be folded.

SUMMARY OF THE INVENTION

It is therefore an object of the present invention to provide a foldable hand truck with a handle being able to be adjusted in length and in angle at any time as appropriate.

It is another object of the present invention to provide a hand truck having four wheels so that it can be pushed forward while its platform for holding articles may be kept substantially parallel to the ground.

It is a further object of the present invention to provide a hand truck which can be vertically and stably positioned without occupying unnecessary space when it is folded.

An another further object of the present invention is to provide a hand truck which can be easily operated to facilitate its utilization.

In pursuance of the above objects, and of others which will become apparent hereafter, the present invention includes a retractible handle set having a first set of round holes and a second set of round holes formed at a lower and a higher position, respectively, a platform movably connected to the lower portion of the handle set, a wheel set fixedly constructed below the handle set and the platform, and a platform retraction mechanism which consists of a housing with its top end movably connectd to the handle set and its lower end movably secured to the underside of the platform, a push button for controlling the platform retraction mechanism, and a pair of push rods provided in the housing with their two outer ends being able to be movably inserted into the first set of round holes or the second set of round holes while the insertion into and the removal out of those round holes of these two outer ends being controlled by the other two inner ends which are shifted by the push button.

BRIEF DESCRIPTION OF DRAWINGS

A specific embodiment of the invention will now be described with reference to the accompanying drawings of which

FIG. 3 is a fragmentary, enlarged, side elevational view illustrating the control means for the extending and retracting as well as the angle adjustment of the handle set of the present invention;

FIG. 4 is a fragmentary, sectional, rear view illustrating the control means for the extending and retracting of the handle set of the present invention;

DETAILED DESCRIPTION OF THE PREFERRED EMBODIMENT

Figure 6:
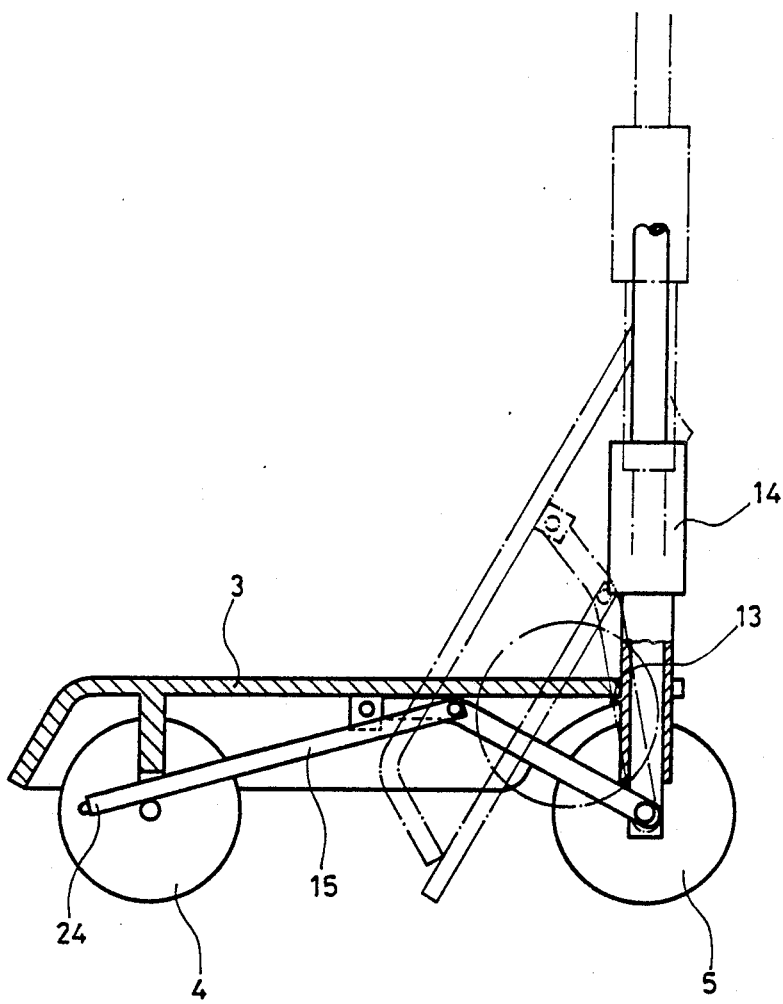
FIG. 6 is a fragmentary, sectional, side view illustrating the movement of the platform of the present invention.
Figure 7:
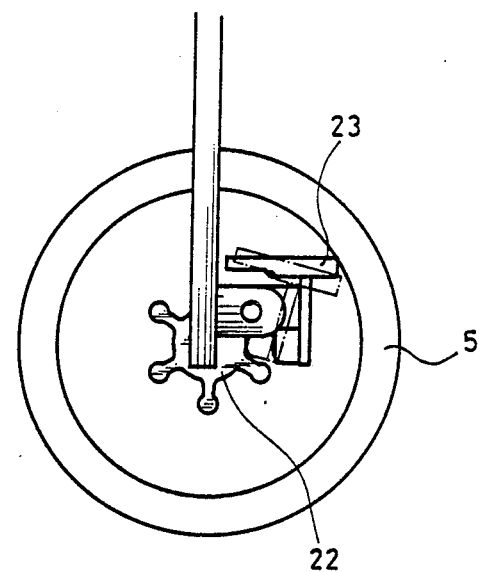
FIG. 7 is fragmentary, side view illustrating the braking means of the present invention as well as the manner in which the braking means is operated.

Referring now to the accompanying drawings, the hand truck as indicated in the present invention includes an upper handle 1, a lower handle 2, a platform 3, front wheels 4, and rear wheels 5. The upper handle 1 and the lower handle 2 are connected by a handle retraction controlling means 6 in such a manner that the upper handle 1 is able to turn relatively to the lower handle 2. The handle retraction controlling means 6 further includes an angle setting member 7 which is fixed onto the lower portion of the lower handle 2, a securing plate 8 which fixed onto the upper handle 1, a pivoted arm 9 which associates the upper handle 1 and lower handle 2 so that the former may turn relatively to the latter, a generally n-shaped push bar of which the one upper end is movably associated to the upper handle 1 and the two lower ends are outward bent and inserted into a round hole set formed on the lower portion of the upper handle 1 through the securing plate 8, and two springs 11 with their two ends separately fixed onto the bent lower ends of the n-shaped push bar 10 and the pivoted arm 9. On the angle setting means 7, a plurality of dents 26 are formed to just receive and confine one of the bent lower ends of the n-shaped push bar 10. By this way, the upper handle 1 may be adjusted to different angles as shown in FIG. 3 without the possibility of changing its position while pushing the hand truck of the present invention forward or backward. At the lower portion of the lower handle 2, a platform retraction mechanism 12 is provided which further includes a housing 14 which is fixed and stuck on a protuberance 13 formed beneath the platform 3, and a steel rod set 15 which is set beneath the platform 3 and is pivotedly connected to the front wheel 4 at one end and to the lower end of the lower handle 2 at the other end. Within the housing 14, a push button base formed with two downward and outward slant slots 17, a spring 21, and a pair of movable rods 20 are provided. Two outer ends 18 of the movable rods 20 movably pass through the housing 14 and insert into holes formed on the lower handle 2, and each of other two inner ends 19 of the movable rods 20 is formed with a projection which is stuck in the slant slot 17. The spring 21 may push upwardly the push button base 16. When the push button base 16 is pressed down, the ends 19 of the movable rods 20 will be slidably moved to approach the central portion of the slant slots 17, and the other ends 18 will consequently moves out of the holes on the lower handle 2 which permits the housing 14 to be able to slide upward and downward along the lower handle 2. The up and down movement of the housing 14 further activates the retraction of the platform 3 and the extension of the platform 3, respectively, as shown in FIG. 6. Near the axle of one of the rear wheels 5, a catch means 22 and a braking means 23 are provided. When the braking means 23 caught in the catch in the stuck means 22, the rear wheels 5 will be stopped from turning.

Figure 1:
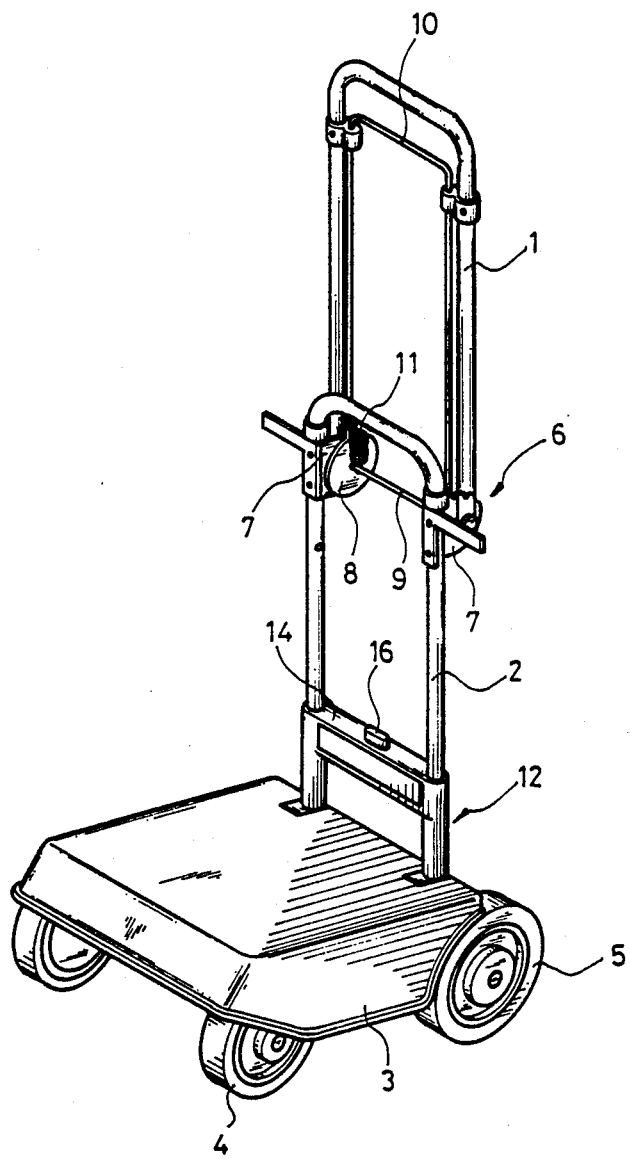
FIG. 1 is a three-dimensional analytical perspective of the present invention showing an extended status of the handle set and the platform thereof.
Figure 2:
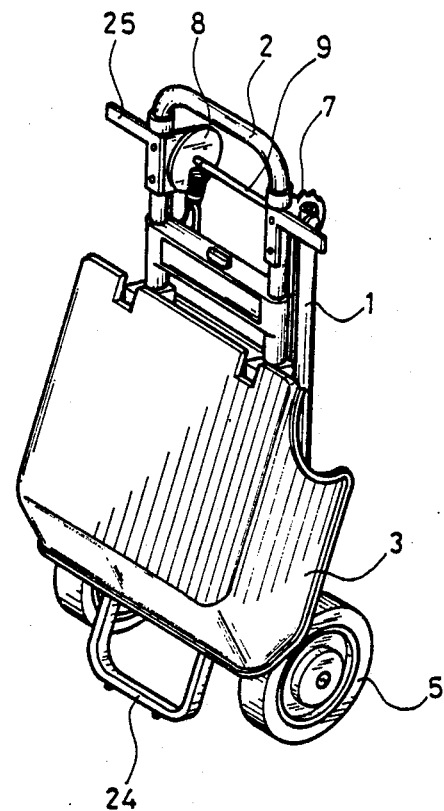
FIG. 2 is a three-dimensional analytical perspective of the present invention showing a folded status of the handle set and the platform thereof as well as a stop member extending against the ground while the invention is in a folded status.
Figure 5:
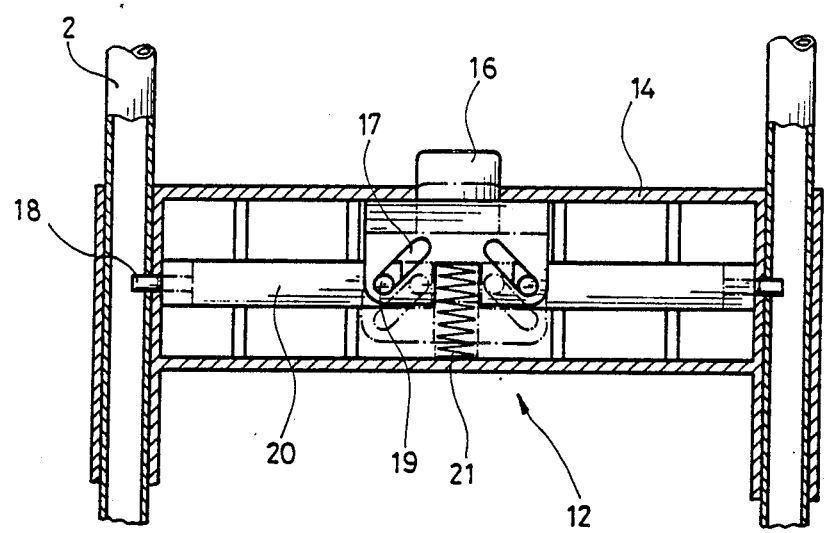
FIG. 5 is a fragmentary, sectional, front elevation view illustrating the movement of a front-cover-removed platform retraction mechanism of the present invention.

In operation, pulling the upper end of the n-shaped rod 10 upwardly to approach the top of the upper handle 1. This permits the outward bent end of the n-shaped rod 10 to move away from the dent 26 where it originally located in, so that the upper handle 1 may be pulled straight upward, or be turned downward to closely attach to the lower handle 2 as shown in FIG. 2, or be turned at different angles to form a suitable position as desired by the user. In order to extend the platform 3 to carry articles, just press down the push button base 16 to have the outer ends 18 of the movable rods 20 leave the lower handle 2, then push the housing 14 downward to stop the movement of the hand truck, and then just force the braking means 23 into one of the dents formed on the catch means 22 to prevent the rear wheels 5 from turning; when the platform 3 is retracted by pressing down the push button base and pulling upward the housing 14, a stop lever 24 formed at the front end of the steel rod set 15 will automatically stretch out to help the retracted hand truck stand stably on the ground. Moreover, there are two hanger-like members 25 provided at the joints of the upper and the lower handles 1 and 2 so that the retracted hand truck may be hung on the wall, if necessary.

It is to be understood that the form of the invention shown and disclosed is to be taken as a preferred embodiment of the invention and that various changes in the shape, size, and arrangment of parts may be resorted to without departing from the spirit of the invention or the scope of the subjoined claims.

We claim:

1. A foldable hand truck, comprising
a retractible and extendable push handle set having a first set of round holes and a second set of round holes separately formed at a lower and a higher positions;
a platform movably provided below said push handle set;
a wheel set being mounted on the lower end of said push handle set and beneath said platform; and
a platform retraction mechanism including a housing with its top end movably associated with said push handle set and with its lower end removably engaged with the underside of said platform; a push button for controlling said platform retraction mechanism; and a pair of movable push rods; wherein two outer ends of said pair of movable push rods may insert into either said first set of round holes or said second set of round holes on said push handle set; and two inner ends of said pair of movable push rods may shift within two slanted slots formed on said push button so as to pull said two outer ends out of said first or said second set of round holes while said push button is pressed down.

2. A foldable hand truck as claimed in claim 1, further comprising a brake mechanism provided beneath said platform.

3. A foldable hand truck as claimed in claim 1, wherein said push handle set includes an upper handle; a lower handle; and a handle retraction control means which connects said upper handle and said lower handle in such a manner that said upper handle may turn relatively to said lower handle to form a retracted position.

4. A foldable hand truck as claimed in claim 3, wherein said handle retraction mechanism includes a securing plate fixed to said lower handle; and a n-shaped controlling rod being movably fixed onto said upper handle at its higher end and being selectively stuck into said securing plate at its lower end.

5. A foldable hand truck as claimed in claim 1, further comprising a braking means disposed nearby said wheel set beneath said platform.

6. A foldable hand truck as claimed in claim 1, wherein said wheel set includes two rear wheels fixedly mounted on the bottomm of said push handle set, and two front wheels fixedly mounted beneath said platform.

* * * * *